US011005681B2

(12) United States Patent
Buecher et al.

(10) Patent No.: US 11,005,681 B2
(45) Date of Patent: May 11, 2021

(54) DATA TRANSMISSION METHOD BETWEEN A PRIMARY MASTER AND PRIMARY SLAVE VIA A BUS LINE AND BETWEEN SUB-SLAVES VIA THE SAME BUS LINE

(71) Applicant: Hengstler GmbH, Aldingen (DE)

(72) Inventors: Johann Buecher, Aldingen (DE); Martin Linden, Donaueschingen (DE); Wolfgang Klaiber, Hausen (DE)

(73) Assignee: HENGSTLER GMBH, Aldingen (DE)

( * ) Notice: Subject to any disclaimer, the term of this patent is extended or adjusted under 35 U.S.C. 154(b) by 0 days.

(21) Appl. No.: 16/051,132

(22) Filed: Jul. 31, 2018

(65) Prior Publication Data

US 2019/0036731 A1    Jan. 31, 2019

(30) Foreign Application Priority Data

Jul. 31, 2017 (DE) .......................... 102017117288.2

(51) Int. Cl.
| | | |
|---|---|---|
| *H04L 12/403* | (2006.01) | |
| *H04L 29/08* | (2006.01) | |
| *G06F 13/362* | (2006.01) | |
| *G06F 13/42* | (2006.01) | |
| *H04L 5/14* | (2006.01) | |

(52) U.S. Cl.
CPC ...... *H04L 12/4035* (2013.01); *G06F 13/3625* (2013.01); *G06F 13/4226* (2013.01); *H04L 5/1476* (2013.01); *H04L 12/403* (2013.01); *H04L 67/12* (2013.01)

(58) Field of Classification Search
CPC combination set(s) only.
See application file for complete search history.

(56) References Cited

U.S. PATENT DOCUMENTS 5,131,085 A * 7/1992 Eikill ................... G06F 13/368
                                                      710/110
5,499,374 A   3/1996 Di Giulio et al.
(Continued)

FOREIGN PATENT DOCUMENTS

DE    10 2010 052537    5/2012
EP         0 980 166    2/2000
(Continued)

OTHER PUBLICATIONS

European Search Report for European Patent Application No. EP18195418 dated Apr. 24, 2019, 10 pages.
(Continued)

*Primary Examiner* — Raymond N Phan
(74) *Attorney, Agent, or Firm* — Moreno IP Law LLC

(57) ABSTRACT

Method for digital, bidirectional data transmission between a position measuring system (3-7) and a motor control device (1) and/or an evaluation unit based on the transmission of frames (34, 35, 36) of a predefined bit length in chronologically sequential time slots (28-30), wherein a primary master (1) communicates via a two wire bus line (2) with the position measuring system (3-7) and/or the motor unit (11, 14) and/or the evaluation unit with a primary slave (3) disposed there, and that additional sub-slaves (12, 15) can be coupled in parallel to the primary slave (3), which sub-slaves communicate on the same bus line (2), which the primary master (1) uses with the primary slave (3).

6 Claims, 3 Drawing Sheets

(56) References Cited

U.S. PATENT DOCUMENTS

Figure 1:
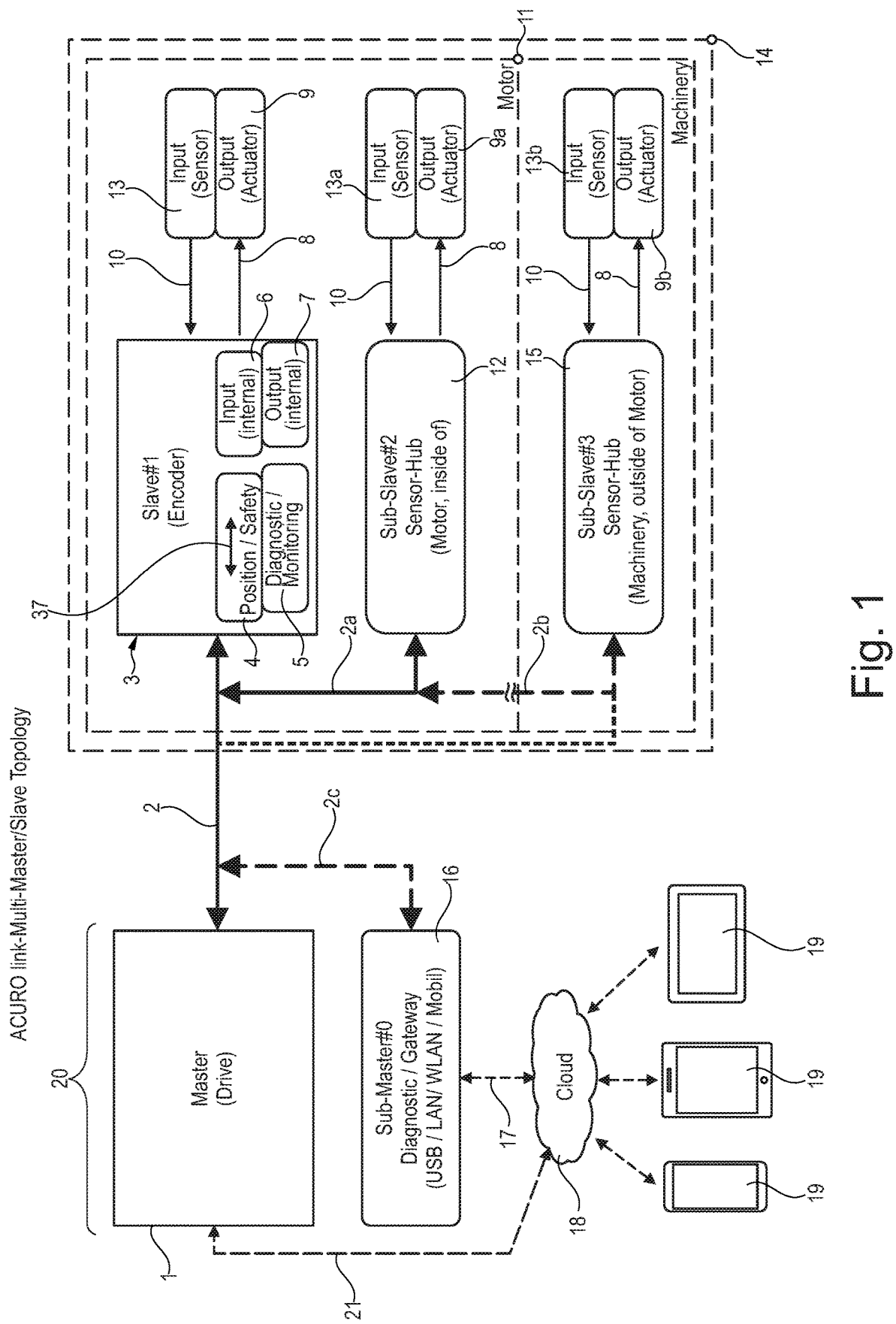

| | | | | |
|---|---|---|---|---|
| 5,793,993 | A * | 8/1998 | Broedner | G06F 13/4291 340/12.31 |
| 6,807,512 | B2 * | 10/2004 | Mazgaj | G01D 21/02 702/163 |
| 6,934,784 | B2 * | 8/2005 | Chheda | G06F 13/24 709/224 |
| 7,206,882 | B2 * | 4/2007 | White, III | H04L 12/40013 710/110 |
| 7,613,592 | B2 * | 11/2009 | Kuhn | G01D 5/24461 702/189 |
| 7,709,765 | B2 * | 5/2010 | Picard | G05B 19/414 219/121.39 |
| 8,207,745 | B2 * | 6/2012 | Sato | G01R 31/024 324/539 |
| 2003/0174724 | A1 * | 9/2003 | Olson | G06F 13/4072 370/420 |
| 2003/0223374 | A1 * | 12/2003 | Hayashi | G05B 19/042 370/242 |
| 2006/0294275 | A1 * | 12/2006 | Lambrache | G06F 13/4077 710/110 |
| 2008/0176530 | A1 | 7/2008 | Kuhn et al. | |
| 2009/0144471 | A1 * | 6/2009 | Lin | G06F 13/4252 710/110 |
| 2010/0201373 | A1 | 8/2010 | Sato et al. | |
| 2011/0142066 | A1 * | 6/2011 | Kasai | H04L 12/4035 370/442 |
| 2011/0202698 | A1 * | 8/2011 | Lotzenburger | H04L 12/40006 710/110 |
| 2012/0072628 | A1 * | 3/2012 | Crockett | G06F 13/4291 710/110 |
| 2013/0297897 | A1 | 11/2013 | Sano et al. | |
| 2013/0345837 | A1 | 12/2013 | Sasaki | |
| 2013/0346659 | A1 | 12/2013 | Sasaki | |
| 2015/0339257 | A1 * | 11/2015 | Hug | H04L 5/16 710/110 |
| 2016/0018794 | A1 * | 1/2016 | Sata | G05B 11/36 700/4 |
| 2016/0103773 | A1 * | 4/2016 | Sauer | G06F 13/16 710/110 |
| 2017/0080568 | A1 | 3/2017 | Yu et al. | |
| 2019/0033815 | A1 * | 1/2019 | Mantovani | G06F 1/12 |

FOREIGN PATENT DOCUMENTS

| | | | |
|---|---|---|---|
| EP | 2098930 A1 | 9/2009 | |
| EP | 2148178 A1 * | 1/2010 | G01D 5/12 |
| EP | 2148178 B1 | 4/2012 | |
| WO | 02/49232 | 6/2002 | |

OTHER PUBLICATIONS

Research Report for German Patent Application No. 102017117288.2 dated Apr. 2, 2019, 10 pages.

* cited by examiner

DATA TRANSMISSION METHOD BETWEEN A PRIMARY MASTER AND PRIMARY SLAVE VIA A BUS LINE AND BETWEEN SUB-SLAVES VIA THE SAME BUS LINE

The present application claims the benefit of German application 10 2017 117 288.2, filed Jul. 31, 2017, the entire contents of which are hereby incorporated herein by reference.

The invention relates to a method for digital, bidirectional data transmission between a position measuring system, such as a rotary encoder, and a motor control system and/or an evaluation unit based on the transmission of frames of a predefined bit length in chronologically sequential time slots.

This type of data transmission method has become known for example with the subject matter of EP 2 148 178 B1.

The known method relates to a control unit, which communicates with a position measuring system and provides for a transmission of data frames in a predefined bit length, wherein in each frame at least one first bit length is provided for transmitting data from the control unit to the position measuring system and at least one second bit length is provided for transmitting data from the position measuring system to the control unit.

Moreover, a time slot is provided in the transmitted frame, in which data are transmitted neither by the control unit to the position measuring system nor from the position measuring system to the control unit and in which a trigger impulse is transmitted from the control unit to the position measuring system, which triggers a position data acquisition in the position measuring system.

The cited protective right deals with a clock pulse for synchronizing the control unit and the measuring system within the first bit length from the control unit to the position measuring system, but, as a rule, utilizes only one single master on the control and evaluation side, which master communicates with an associated slave on the rotary encoder side.

A block diagram is depicted in FIGS. 6 and 7 thereof, in which the master is designated as a "processing unit interface" and the associated position measuring system as a "position encoder interface".

The master is connected to the attached position measuring system via a total of four lines, specifically two control lines and two power supply lines.

In another exemplary embodiment according to FIG. 7, the data are modulated onto the power supply line, so that a two wire bus system is realized between the master and the position measuring system.

The disadvantage of the known method, however, is that only one master and one slave are available for the bidirectional data transmission between the control unit and a position measuring system, which is associated with different disadvantages.

A first disadvantage is that no additional sensors can be attached, which can also be addressed, and a further disadvantage is that no additional master control units, which could carry out additional tasks in addition to the primary master, can be used either.

Overall, the known method, which starts from a two wire transmission line and a control unit and an attached primary slave, is associated with the disadvantage that higher level master tasks and the connection of several slaves are not provided.

As a result, the problem on which the invention is based, proceeding from EP 2 148 178 B1, is further developing a method for the digital, bidirectional data transmission between a control unit and a position measuring system in such a way that a plurality of additional slaves and a plurality of additional sensors can be attached, all of which can be addressed by the master.

To solve the stated problem, the invention is characterized by a primary master, which communicates via a two wire bus line with the position measuring system and/or the motor unit (and/or the evaluation unit with a primary slave disposed there, and that additional sub-slaves can be coupled in parallel to the primary slave, which sub-slaves communicate on the same bus line, which the primary master uses with the primary slave.

A feature of the invention is that, starting from a primary master, which communicates with a motor unit via a two wire bus line, it is now provided according to the invention that additional sub-masters can also be attached to the primary master on the same bus line and that furthermore additional sub-slaves can be coupled in the area of the motor unit to the primary slave attached there, and the sub-slaves likewise communicate via bus connections on the same bus line that the primary master uses with the primary slave.

The given technical teaching yields the advantage of an expansion of a known data transmission method, because it is now possible for the first time to assign one or a plurality of sub-masters to the primary master on the control unit side.

As a result, the scope of application of such a data transmission method has expanded, because the one or plurality of sub-masters attached in parallel to the primary master are now able to carry out tasks that are independent of the primary master, something that was not previous known. As a result, the primary master is able to realize a rapid data traffic via the control bus, and other tasks that are normally allocated to a primary master are outsourced and assigned to (one or a plurality of) sub-masters attached in parallel to the primary master.

A feature of the invention is that a primary master communicates via a two wire bus line with the position measuring system and/or the motor unit and/or the evaluation unit with the primary slave disposed there, and that additional sub-slaves can be coupled in parallel to the primary slave, which sub-slaves communicate on the same bus line, which the primary master uses with the primary slave.

A first exemplary embodiment provides that a first sub-master is connected in parallel to the primary master on the control unit side and that the sub-master can now communicate directly with an internet based or device based data cloud and can supply the data generated by the primary master to the cloud. Moreover, the sub-master can carry out additional tasks, such as e.g., diagnostic tasks or making a gateway available, with which the sub-master supplies the data from the primary master to the internet, or to a LAN or a WLAN or to a mobile data system.

In a further development, it is thereby provided that the other peripheral devices can be triggered originating from the cloud, such as e.g., terminals for the data display of the generated and/or processed data.

As a result, a first preferred embodiment provides that further secondary masters, which carry out additional tasks on the control unit side, can be connected in parallel to the primary master.

As a result, it is now provided that also on the motor unit side, where, according to the prior art, only one single slave was disposed in the form of a position measuring system, henceforth additional sub-slaves are connected in parallel to the first mentioned primary slave parallel.

This results in an essential expansion of the scope of responsibility of the motor unit, because now further sub-slaves can be connected in parallel to the primary slave that is configured as an encoder, which sub-slaves operate via suitable bus lines on the central control bus.

It is advantageous that e.g., a first secondary slave makes available the interface for different sensor inputs, all of which are disposed in the motor unit. A second secondary slave can also be present, which makes available an interface for machine data or data disposed outside the motor, such as e.g., temperature, humidity, vibration and the like.

It is important that all slaves, i.e., the primary slave and the secondary slaves potentially attached in parallel thereto, themselves now in turn have sensor inputs and actuator outputs, i.e., an input for a sensor disposed there can be provided directly via every slave, and the slave itself can also trigger an attached actuator.

This type of triggering of an actuator is e.g., a motor brake, the triggering of a control light and other devices.

What is important in the configuration of the motor unit is that the slaves that are connected in parallel also carry out a data communication with each other, i.e., they do not require any data traffic and any triggering with the primary master via the primary bus line, rather they are able to communicate with each other and exchange data via the branched bus that branches off from the primary bus line.

For the slaves to communicate with each other, the primary data traffic (MRF to DTF1) must not be restricted. The communication of the slaves with each other is conducted in DTF2, without burdening the primary communication.

According to the subject matter of the invention, it is now possible for the first time to achieve a data transmission rate in the entire bus system of e.g., 10 MBaud or greater in order to make available a cyclic communication, wherein it is provided, according to another feature of the inventive method, that a total of three time slots are available for the continually repeating data transmission.

In a first time slot, the primary master has the word, i.e., the master generates a command via the MRF (master request frame), which is communicated to the attached slaves via the central bus line via the two wire line.

This takes place in a relatively short time slot, and upon completion of the transmitted primary master command, a second time slot starts at a specific point in time, in which the triggered slaves respond with a specific data packet.

Said data packet can be e.g., the position data of the encoder system in the primary slave, with which the CRC data and live counter data are transmitted.

A separate (the second) time slot is thus assigned to the primary slave, and it is important that a third time slot is available, in which the primary slave can optionally undertake a data exchange via the central bus line with the master control units, but also that in said third time slot the sub-slaves are able to carry out a data communication with the master control units.

As a result, a strict separation is maintained between the data transmission of the primary slave in the second time slot and a data transmission in the third time slot, in the scope of which the primary slave can namely also still transmit data, wherein the third time slot is provided primarily for a further data transmission of the sub-slaves with each other, for a data transmission to the primary slave and a data transmission to the master control unit.

Data communication is controlled by the respective master command word, which can be different depending on the case, and the primary slave or the sub-slaves that are connected in parallel thereto are correspondingly triggered and respond to the corresponding request command.

Furthermore, it is advantageous that the sub-slaves can communicate with each other with the primary slave on the motor unit side, wherein such an exchange takes place in the third time slot, and this is controlled by a master command MSRD Send Request Data with Multicast Replay data exchange broadcast (slave traffic).

This makes it clear that the third time slot is used for lower level data exchange tasks, when the second time slot is exclusively available to the primary slave, which transmits especially time critical position data in said data frame.

The primary master can have a scan list, which it determines itself or receives in a configured manner, in order to then repeatedly invoke or directly query participants that are attached via the central two wire bus line.

Configured in the scan list are the addresses, the ID and the page of the starting address to the ending address and said data can also be available several times. Said communication is transmitted in the MRF time slot 1, wherein the sub-participant with the corresponding ID in sub-slot 3 then receives corresponding write and read rights to transmit data from one participant to another.

Data transmission according to the prior art in accordance with EP 2 148 178 B1 was clearly limited, because the participants could communicate with each other only in specific windows (frames) so that the position data, which is time critical, had to be transmitted without interruption in order to transmit the required quantity of position data.

This means that the position data were transmitted in different frames, which is associated with difficulties in the evaluation unit, because the evaluation unit must reassemble the different frames again. As a result, the complicated generation of synchronization signals was required.

This resulted in the problem that a timeframe was no longer available to transmit additional data.

The invention begins here in that it defines, in addition to the time slot 1, in which the time critical data are transmitted, a second-time slot during which, depending on the MRF command, either the data of the second-time slot are copied or another data generation takes place.

The advantage of the present invention is also that the central bus line and also the slaves and sub-slaves attached to the bus line can have an overall connection length of more than 100 m, which was previously only known with various two wire bus systems, such as e.g., the AS control bus and others, which achieve only a very slow data transmission, however.

Consequently, the invention avoids a fragmented transmission of related data packets, rather provides that the data packets are transmitted as a whole in chronologically separated time slots.

The subject matter of the present invention is yielded not only from the subject matter of the individual patent claims, but also from the combination of individual patent claims with each other.

All information and features disclosed in the documents, including the abstract, in particular the spatial configuration depicted in the drawings, are claimed as essential to the invention, insofar as they are novel individually or in combination over the prior art.

The invention will be explained in greater detail in the following based on drawings depicting merely one execution path. In this connection, further features essential to the invention and advantages of the invention are derived from the drawings and the description thereof.

The drawings show:

FIG. 1: Block diagram of a first embodiment of a data transmission method according to the invention FIG. 2: A block diagram that has been modified as compared to FIG. 1 and is depicted with other modules FIG. 3: The time command diagram of the data transmission via the central bus line A control unit 20 is depicted generally in FIG. 1, in which a primary master 1 is disposed.

The control unit 20 is disposed away from a motor housing, which in the depicted exemplary embodiment is comprised of a motor interior 11 and a motor environment 14.

It is important that the connection between the control unit 20 and the modules 11, 14 is realized by a bus line 2, which is configured as a two wire bus line and via which the power supply is also provided for all slaves, sensors and other modules attached in the parts 11, 14.

According to the invention, it is now provided that a secondary master 16 is connected to the primary master 1, which secondary master is also designated as the sub-master and which communicates directly with the bus line 2 of the primary master 1 via a bus line 2c.

Said sub-master 16 carries out administrative tasks that are separate from the master 1 and makes available e.g., a USB interface, a LAN, a WLAN or a mobile interface link and is therefore in a position to communicate directly via the link 17 to a cloud 18.

As a result, the primary master 1 is also able to directly upload its data to the cloud 18 via the link 21, in the same way as the sub-master 16 is able to via the link 17.

Corresponding links can be available on the cloud 18, via which terminals 19 are triggered that analyze, process or optically display data that are generated on the control unit 20.

In the opposite manner, it is also possible that a control software is made available on the terminal 19 side, and the terminals 19 are connected to the cloud via links in the cloud 18. This is suitable via the links 17, 21 to a direct data and command transmission on the primary master 1 and the sub-master 16 attached in parallel thereto.

It is advantageous that the entire motor side 11, 14 can now be triggered via the central bus line 2, which consists preferably of a two wire bus line.

The motor side consists of the motor environment 14, which can also be disposed outside the motor housing, and of the modules disposed in the motor interior 11. Sensors and/or actuators are preferably disposed in the motor environment.

The exemplary embodiment according to FIG. 1 shows that a primary slave 3 in which a rotary encoder is implemented is now disposed in the interior of the motor 11 in a manner that is known per se.

All other modules required for data processing and data transmission are also disposed in said primary slave 3, such as e.g., a position module 4, which can have a redundant channel 37 if necessary and an associated status module 5 and other modules, which can be configured e.g., as input or output modules 6, 7.

The result of this is that the primary slave 3 is able to trigger an actuator or a plurality of actuators 9 via a signal path 8 and, conversely, one or a plurality of sensor inputs of sensors 13 can be present which carry out a data exchange with the primary slave 3 via the signal path 10.

The invention now provides that further sub-slaves are henceforth assigned to the primary slave 3, all of which are connected in parallel and are able to communicate with the primary slave 3 via corresponding branches of the central bus line 2, but also directly with the primary master 1.

Thus, the exemplary embodiment according FIG. 1 shows that a sub-slave 12 can also be disposed in the motor interior 11, which generates, processes and forwards e.g., additional data in the motor interior. This type of data could be e.g., the motor temperature, humidity, vibration and the like.

Said sub-slave also has the signal path 8 to actuators 9a and sensors 13a to be triggered, which transmit data to the sub-slave 2 via the signal path 10.

As further exemplary embodiment, FIG. 1 shows that another sub-slave 15 can also be connected in parallel to sub-slave 2, which is then preferably located outside the motor interior 11, specifically e.g., in the environment of the motor.

In this regard, it can be machine data, which is collected outside the motor by the sub-slave 15, such as e.g., temperature, humidity, vibration and other data that are derived directly from the machine in which the motor is installed.

In this case as well, the invention provides that actuators 9b are triggered by the signal path 8 and, conversely, a plurality of sensors 13b supply data to the sub-slave 15 via the signal path 10.

The division of the transmission protocol into a total of three time slots ensures that not only two sub-slaves 12, 15 can be connected in parallel, but a plurality of other sub-slaves, which are not depicted for the sake of comprehensiveness.

Figure 2:
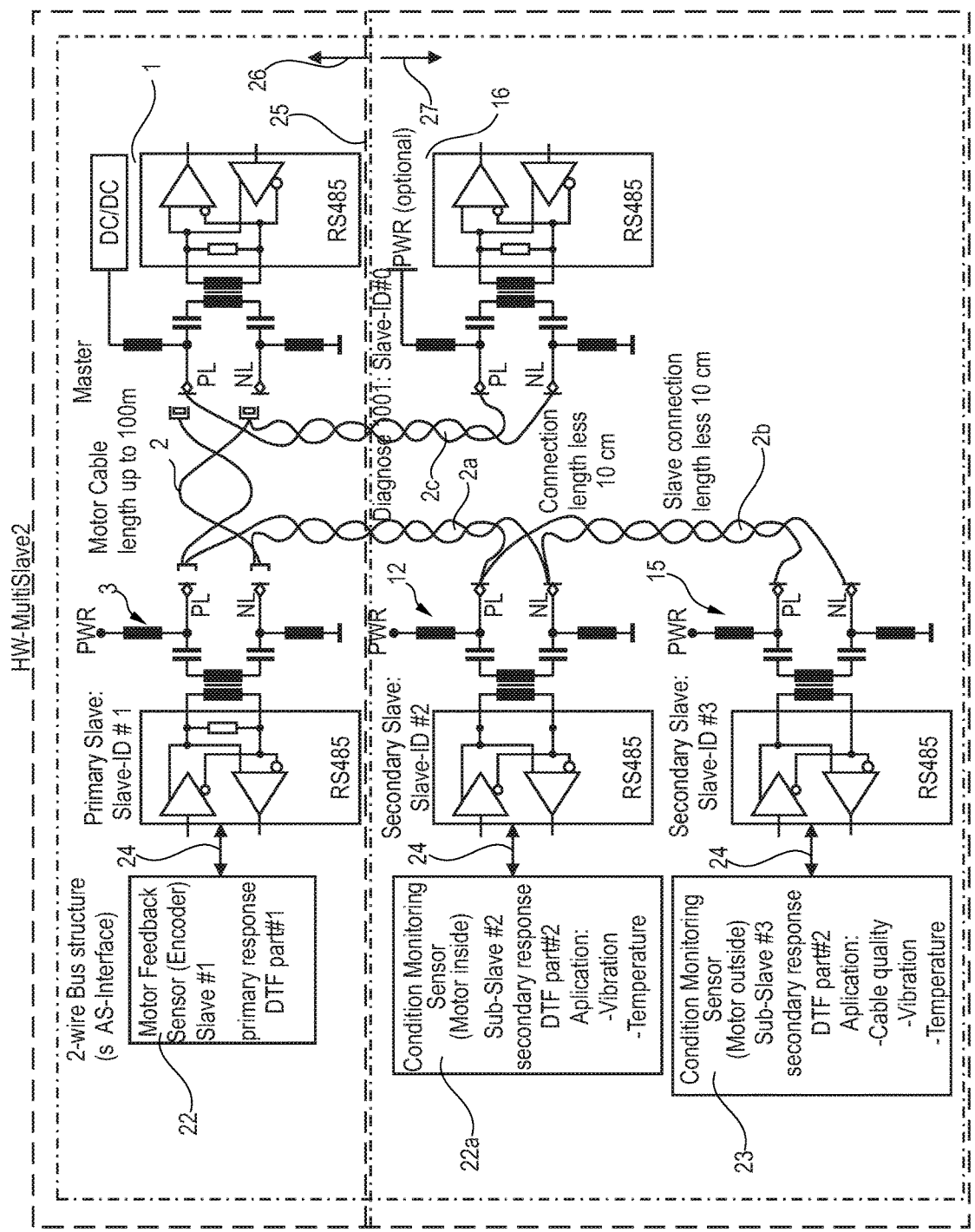

In comparison to FIG. 1, FIG. 2 shows approximately the same structure, where is evident that the primary master 1 and a sub-master 16 connected in parallel thereto are located on the right side, and the cited masters are connected to each other via a bus line 2c branching off from the central two wire bus line 2.

The simplified depiction in FIG. 2 shows merely the interface of the respective masters 1, 16 and other interface circuits, without providing any details about the electrical components.

According to one feature of the invention, it can also be provided, however, that the bus line that is configured as a two wire bus line 2 can also be configured as a four wire bus line, wherein two wires are used for the control commands and two other wires for the power supply.

This applies not just to the bus line 2, but also to the bus lines 2a, 2b, 2c attached thereto.

Moreover, it can be provided in another embodiment of the invention that the central bus line 2 is configured in a two wire or four wire design and, in a similarly deviating manner, the bus lines 2a, 2b, 2c attached thereto are likewise configured, optionally and in any combination thereof, as two wire or four wire bus lines.

The slaves 3, 12, 15 are depicted in the center portion of FIG. 2 only in a schematic representation and it is evident that said slaves are also connected to each other via the two wire or the four line bus line 2a, 2b and can also communicate with each other.

A sensor module 22 is thereby disposed at the output of the primary slave 3, in which the time critical rotary encoder is disposed, wherein said primary slave may communicate in time slot 2 (DTF 1).

A line 24 is provided for this purpose.

The additional sensor module 22a is connected to the secondary slave 12 via another line 24 and includes for example sensors for the detection of the vibration, the temperature, the humidity and other physical parameters and is provided in order to communicate only in time slot 3, specifically in DTF 2.

The third sub-slave 15 is coupled to another sensor module 23 via another line 24, and in this case, it is provided that the sensor module 23 communicates only in the third time slot DTF 2. Such communication relates e.g., to checking the connecting cable, detecting the vibration, temperature and other parameters, which may be present in the motor interior or in the machine interior or in the outer area.

In principle, FIG. 2 also partially depicts the prior art, which is explained based on the dividing line 25.

Everything above the dividing line 25 in arrow direction 26 is in principle an arrangement of the prior art, and the invention lies therein that said prior art is continued on the other side of the dividing line 25, and specifically downwards in arrow direction 27, where it can be seen that, according to the invention, a plurality of sub-masters are now assigned to the primary master, and that one or a plurality of sub-slaves 12, 15 are likewise assigned to the primary slave 3 on the motor side.

Figure 3:
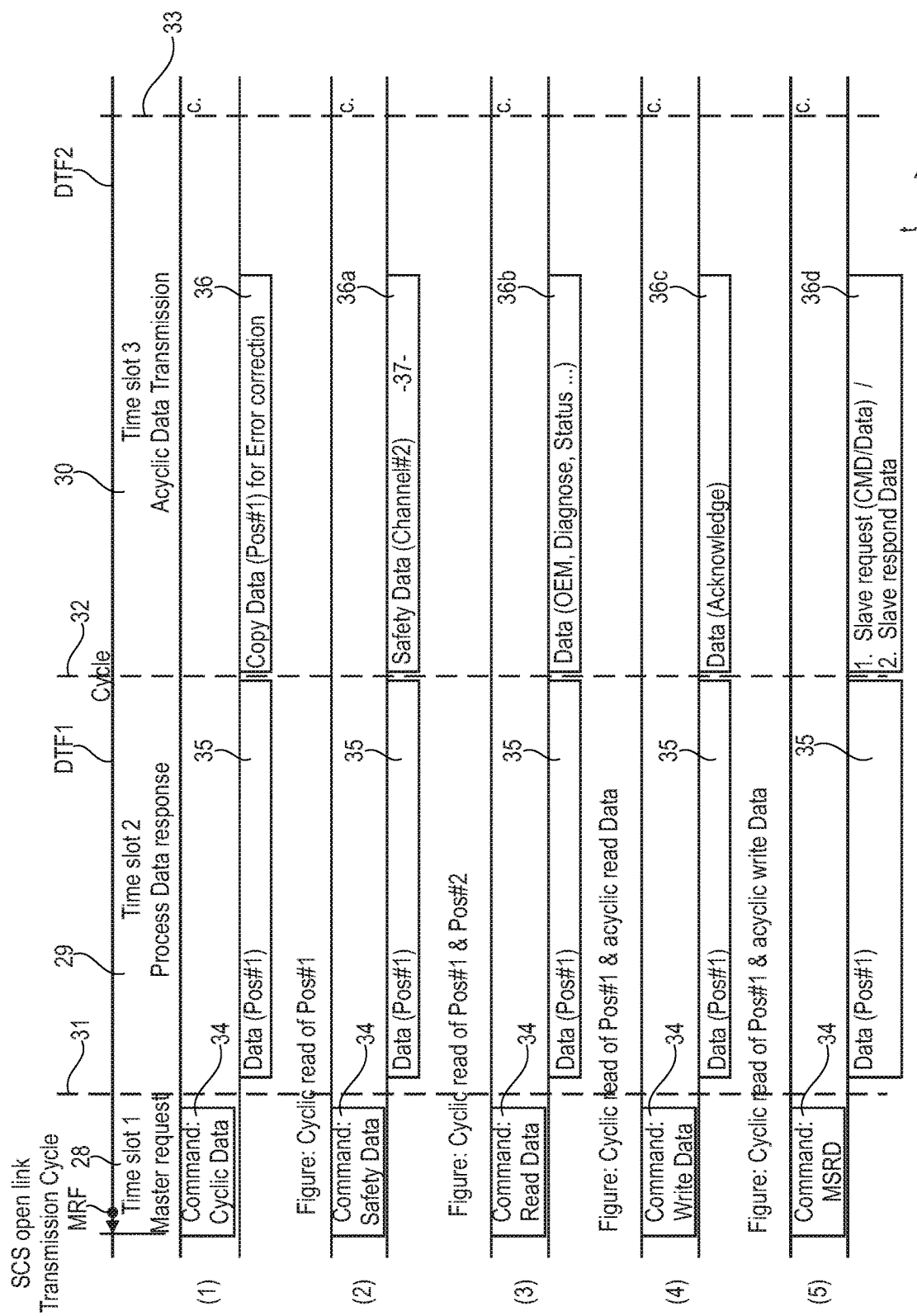

FIG. 3 shows the time command diagram in which data transmission, originating from the primary master 1, makes a master request frame (MRF) available in time slot 28 (time slot 1) according to FIG. 3.

Five different types of commands are depicted among each other in FIG. 3 on the abscissa, wherein, in example (1), a primary master command 34 is generated by the primary master 1 and transmitted via the central bus line 2.

It is a standard command, with which the position data for example are requested and in time slot 2 (reference sign 29), DTF1, the primary slave may then respond with a primary slave response 35.

The second time slot 29 extends from time point 31 to time point 32 and, upon completion of said time period, the third time slot 30 begins, in which a further data transmission takes place. The primary slave response 36 is transmitted e.g., in time slot 3 and relates to the data that are transmitted as a copy or an error correction takes place.

Upon completion of time slot 3 (DTF2) at time point 33, the process repeats cyclically and the primary master 1 transmits its master command via the MRF.

In the exemplary embodiment according to (2) in FIG. 3, the primary master transmits in time slot 1 the request to convey safety data, which means that the position data are requested from a redundant channel of the rotary encoder and the primary slave responds with the primary slave response 35 in time slot 2.

Upon completion of the transmission in time slot 2, a transmission of data takes place in time slot 3 (30), wherein e.g., the safety data are transmitted in a redundant channel 37 and the primary slave response 36a takes place.

In the exemplary embodiment according to FIG. 3 in accordance with (3), a "Read Data" command is generated by the primary master 1 in the MRF and the requested data are transmitted in time slot 2 in the primary slave response.

Then, in time slot 3 the additional data are transmitted, such as e.g., OEM data, diagnostic data or status data, wherein said data are transmitted by the respective sub-slave that is addressed by the master. This can be a primary slave, but also the sub-slaves 15.

In the exemplary embodiment according to (4) in FIG. 3, a write command is generated by the primary master in the MRF, and the addressed slave responds in time slot 3 with an acknowledgement command.

In the exemplary embodiment according to (5), a so-called MSRD command is transmitted. The abbreviation means "Send Request Data with Multicast Replay data exchange broadcast (slave cross traffic)".

This means that during the generation of the primary master command 34, the primary slave responds in the normal manner with its position data, but that, in the second time slot (30), the cross traffic between the slaves is initiated, in that a corresponding command is transmitted and the slaves and sub-slaves can now exchange data with each other. It can also be provided that, after a data exchange has taken place, sub-slaves that exchanged their data with each other transmit an acknowledgement to the primary master.

Furthermore, it can be provided that the slaves carrying out the data exchange slaves do not communicate with the primary master, rather with the secondary master 16.

For example, the following data of the primary slave are transmitted in time slot 2 (29):
1. Multiturn information
2. Singleturn information
3. Live counter
4. Checksum CRC According to the exemplary embodiment (1), the following data are generated in the third time slot (30):
1. Copy of the first data
2. Multiturn
3. Singleturn
4. Live counter
5. CRC
6. Additional status information
7. All data, all of which are used for a possible error correction.

A typical value of 31.25 microseconds is indicated as a time interval between the start of the first time slot 28 and the end of the cyclic data transmission at position 33.

As a result, data repetition rates of 32 KHz, 16 or 8 KHz are achieved depending on the configuration.

The invention claimed is:

1. Method for digital, bidirectional data transmission between a position measuring system and a motor control system and/or an evaluation unit based on the transmission of frames of a predefined bit length in chronologically sequential time slots, wherein a primary master communicates via a two wire bus line with the position measuring system and/or the motor unit and/or the evaluation unit with a primary slave disposed there, and that additional sub-slaves can be coupled in parallel to the primary slave, which sub-slaves communicate with the primary slave and each other on the same bus line that the primary master uses with the primary slave.

2. Method according to claim 1, wherein at least one sub-master is attached to the primary master on the same bus line.

3. Method according to claim 1, wherein the sub-slaves connected in parallel to the primary slave have sensor inputs and actuator outputs.

4. Method according to claim 1, wherein a first sub-master is parallel to the primary master and the first sub-master communicates with an internet based or device based cloud and supplies the data generated by the primary master to the cloud.

5. Method according to claim 4, wherein the sub-master carries out additional tasks, such as diagnostic tasks or making a gateway available, with which the sub-master supplies the data from the primary master to the internet, or to a LAN or a WLAN or to a mobile data system.

6. Method for digital, bidirectional data transmission between a position measuring system and a motor control system or an evaluation unit based on the transmission of frames of a predefined bit length in chronologically sequential time slots, wherein a cyclically repeating data frame consisting of at least three chronologically sequential time slots is available and that a primary master transmits and/or receives data in a first time slot, that the data response of the primary slave to the master is transmitted in a second time slot in the form of the time critical position data and that additional data are transmitted in the third time slot from a primary slave and/or sub-slaves that are attached in parallel thereto, wherein the primary slave and the sub-slaves communicate with each other in the third time slot.

* * * * *